US008660016B2

(12) United States Patent
Punreddy et al.

(10) Patent No.: US 8,660,016 B2
(45) Date of Patent: Feb. 25, 2014

(54) TESTING AND MONITORING VOICE OVER INTERNET PROTOCOL (VOIP) SERVICE USING INSTRUMENTED TEST STREAMS TO DETERMINE THE QUALITY, CAPACITY AND UTILIZATION OF THE VOIP NETWORK

(75) Inventors: Ajay Punreddy, Tyngsboro, MA (US); Mike Regan, Salem, NH (US); Marc A. Snider, Merrimack, NH (US); Richard W. Shea, Maynard, MA (US); Brian Silver, North Reading, MA (US)

(73) Assignee: Aspect Software, Inc., Lombard, IL (US)

( * ) Notice: Subject to any disclaimer, the term of this patent is extended or adjusted under 35 U.S.C. 154(b) by 174 days.

(21) Appl. No.: 11/888,985

(22) Filed: Aug. 2, 2007

(65) Prior Publication Data

US 2008/0031153 A1 Feb. 7, 2008

Related U.S. Application Data

(60) Provisional application No. 60/835,483, filed on Aug. 3, 2006.

(51) Int. Cl.
*H04L 1/00* (2006.01)

(52) U.S. Cl.
USPC ............................. 370/250; 370/248; 370/252

(58) Field of Classification Search
USPC .......................................... 370/248, 250, 252
See application file for complete search history.

(56) References Cited

U.S. PATENT DOCUMENTS

| | | | | |
|---|---|---|---|---|
| 6,356,545 B1 * | 3/2002 | Vargo et al. | ................... | 370/355 |
| 6,529,499 B1 * | 3/2003 | Doshi et al. | ................... | 370/352 |
| 6,816,464 B1 * | 11/2004 | Scott et al. | ................... | 370/252 |
| 6,947,385 B2 * | 9/2005 | Havens | ................... | 370/236 |
| 7,016,340 B1 * | 3/2006 | McKinion | ................... | 370/352 |
| 7,239,629 B1 * | 7/2007 | Olshansky et al. | ........... | 370/353 |
| 2002/0141392 A1 * | 10/2002 | Tezuka et al. | ................ | 370/352 |
| 2003/0033406 A1 * | 2/2003 | John et al. | ................... | 709/224 |
| 2005/0152339 A1 * | 7/2005 | Scott et al. | ................... | 370/352 |
| 2006/0187824 A1 * | 8/2006 | Huang et al. | ................ | 370/229 |

* cited by examiner

*Primary Examiner* — Jason Mattis
(74) *Attorney, Agent, or Firm* — Husch Blackwell LLP

(57) ABSTRACT

The present invention enables testing of a VoIP network using various instrumented test streams. The testing can determine the quality of the transmission network before an internet VoIP service is put into production. The testing also enables regular diagnostic audits of a VoIP network to maintain the quality of the VoIP network. The testing enable measurement of, for example jitter, packet loss and delay and allow characteristics of the VoIP network to be obtained. In addition, the present invention can to determine the capacity and utilization of a VoIP transport network. Based on the measurements and characteristics of the VoIP network the present invention can control routing of a call on the VoIP network or can prevent a call from being made. The present invention also enables dynamic switching of CODECS during a session to enhance the performance of the VoIP network.

16 Claims, 7 Drawing Sheets

TESTING AND MONITORING VOICE OVER INTERNET PROTOCOL (VOIP) SERVICE USING INSTRUMENTED TEST STREAMS TO DETERMINE THE QUALITY, CAPACITY AND UTILIZATION OF THE VOIP NETWORK

RELATED APPLICATION

This application claims priority to U.S. Provisional Patent Application Ser. No. 60/835,483, filed Aug. 3, 2006, the contents of which are hereby incorporated by reference.

FIELD OF THE INVENTION

The present invention relates generally to a voice over Internet Protocol (VoIP) network, and more particularly to testing the VoIP network to determine the quality of the VoIP network.

BACKGROUND

The conventional telephony network allows users to communicate with each other through a central system of switches, which can be referred to as a telephone exchange. The telephone exchanges provide electrical or optical switches to connect users and allow communication. The conventional telephony network is often referred to as a public switched telephone network (PSTN). The switches and other equipment necessary to make a connection can be located, for example, in central offices (COs) and in customer premises. The PSTN can have local exchanges that allow a user to call another user of the PSTN through COs of the local exchange. The PSTN can also have long lines that allow long distance call transmission, such that a user can call another user on the PSTN that is not part of the local exchange. In this case, the call may be routed through multiple COs until the call reaches the called parties local exchange.

After new equipment is installed in a PSTN, but before it is available for use, the new equipment goes through series of tests to ensure that the equipment is functioning properly. The testing stresses the equipment using various test streams. Such testing ensures that when the equipment is used in network by users, the equipment functions properly under various conditions.

In recent years, voice over Internet Protocol (VoIP) has provided an alternative to the conventional telephone exchanges. VoIP is a technology that allows a user to make telephone calls using an Internet connection instead of a conventional phone line and the conventional exchanges. VoIP uses the Internet as the transmission medium for telephone calls by sending voice data in packets using an Internet Protocol (IP) rather than by traditional circuit transmissions of the PSTN. A VoIP call may be carried by multiple routers over the Internet. VoIP is an attractive alternative to conventional telephony systems since a single network can be used to transmit both voice and data.

Typically a VoIP network is available to users with no testing of the quality of the VoIP network. The lack of testing of a VoIP network can result in low quality communications, which can be inadequate for users of the VoIP network.

It is, therefore, desirable that a VoIP network be tested prior to the availability of the VoIP network to the users. Such testing would ensure that users enjoy a high level of quality from the VoIP network. It is further desirable that periodic testing of the VoIP network be implemented to ensure that the quality of the VoIP networks remains at an acceptable level for the user.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Some embodiments of the present invention enable testing of a VoIP network using various instrumented test streams. The testing can determine the quality of the transmission network before an internet VoIP service is put into production. The illustrative embodiment also enables regular diagnostic audits of the VoIP network to maintain the quality of the VoIP network. The illustrative embodiment enables measurements of jitter, packet loss and delay, for example, and allows characteristics of the VoIP network to be obtained. In addition, the illustrative embodiment can determine the capacity and utilization of a VoIP transport network. Based on the measurements and characteristics of the VoIP network the present invention can control routing of a call on the VoIP network or can prevent a call from being made. The present invention also enables dynamic switching of CODECS during a session to enhance the performance of the VoIP network.

Figure 1:
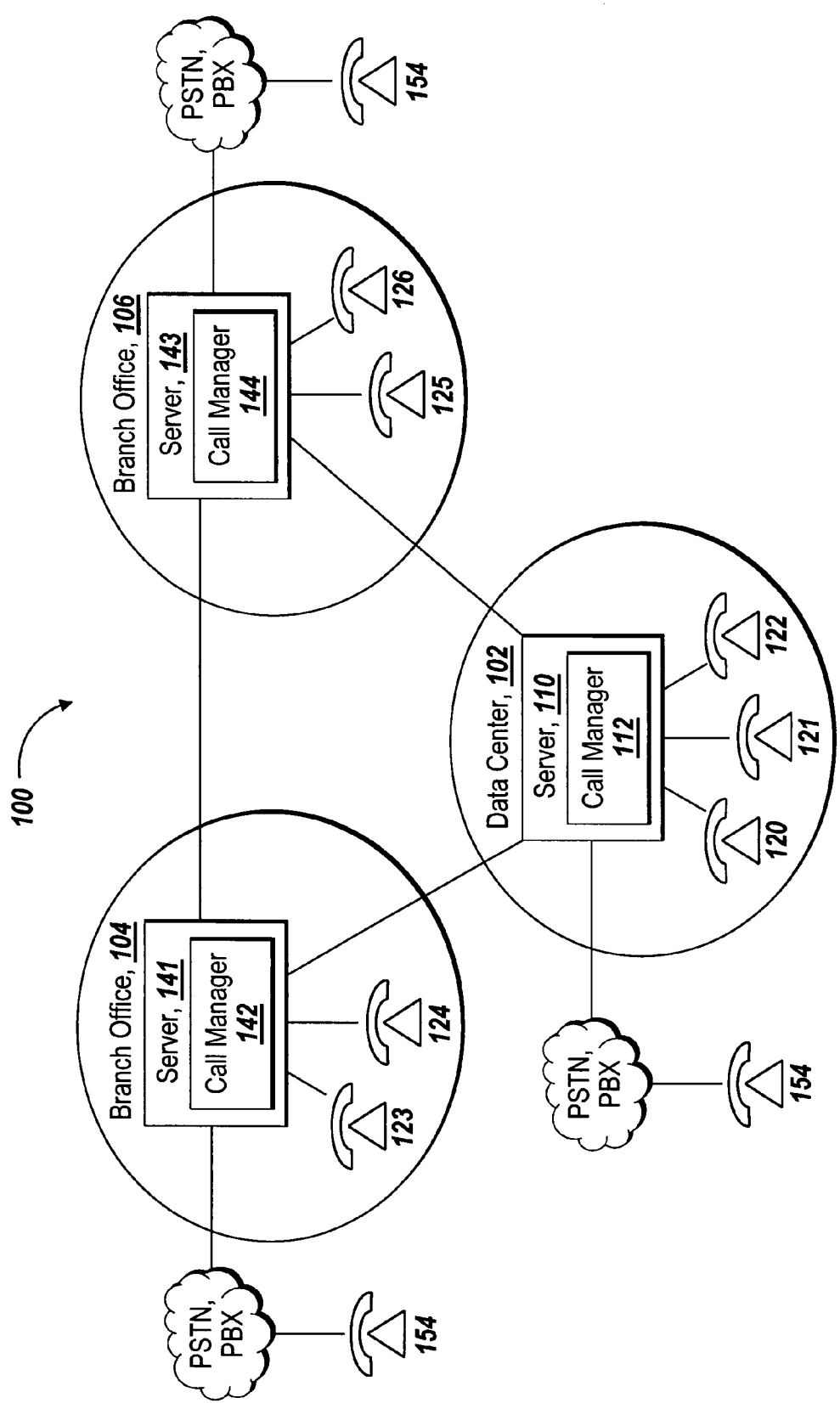
FIG. 1 depicts an example of an illustrative VoIP network in accordance with the present invention.

FIG. 1 depicts an example of an illustrative software based VoIP network 100 that can be implemented in accordance with the present invention. The VoIP network 100 includes a data center 102, a branch office 104 and a branch office 106.

One skilled in the art will recognize that the VoIP network 100 is merely an illustrative example and that a myriad of different configurations can be formed within the scope of the present invention. Further, it will be recognized by one skilled in the art that the VoIP network can be configured without branch offices or without a data center, or the VoIP network 100 can include multiple data centers.

Communication devices 120-126 can be a computing device that can originate and receive calls and can include a software based phone. The communication devices can also be a SIP phone, a cellular phone, a PDA, laptop or any other device that is capable of receiving and/or originating a voice call in a VoIP network.

The data center 102 includes a server 110 with a call manager program 112 that is loaded on the server 110, a communication device 120, a communication device 121 and a communication device 122. The server 110 is connected to each of the communication devices 120-122. The server 110 can also connect to the PSTN and a PBX.

The call manager 112 is a computer program that controls communications among the communication devices 120-122 of the data center as well as between the communication devices of the data center and the branch office 104 or the branch office 106. The call manager 112, for example, allows the communication device 120 to call the communication device 121. The call manager 112 also enables the communication devices 120-122 to call phones on the PSTN and a PBX. The call manager can, for example, allow the communication device 120 to call a phone 152 on the PSTN or a PBX. An example of the call manager 112 is SESSION-SUITE™ from BlueNote Networks, Inc. of Tewksbury, Mass.

The branch office 104 includes a server 141 with a call manager program 142, and the branch office 106 includes a server 143 with a call manager program 144. The call managers 142 and 144 can provide identical functionality as the call manager 112. The branch office 104 includes a communication device 123 and a communication device 124. The branch office 106 includes a communication device 125 and a communication device 126. The data center 102, the branch offices 104, and the branch office 106 can be connected using a virtual private network (VPN).

Each of the data center 102, the branch office 104 and the branch office 106 can have multiple servers, where each server includes a call manager. For example, each of the data center 102, the branch office 104 and the branch office 106 can include a second sever with a second call manager to process calls. The multiple call managers can provide multiple routing paths for calls made on the VoIP network and can also increase the number of calls each of the data center 102, the branch office 104 and the branch office 106 can process.

The communication device 122 of the data center 102 can communicate with the communication device 124 of the branch office 104 or with the communication device 125 of the branch office 106 by originating a call that is processed by the call manager 112, which sends the call to the call manager 142 or 144, which in turn, processes the call and sends it the communication device 124 or 125, respectively. The call managers 142 and 144 also allow the communication devices 124 and 125 to communicate with a phone 154 on the PSTN or a PBX.

Figure 2:
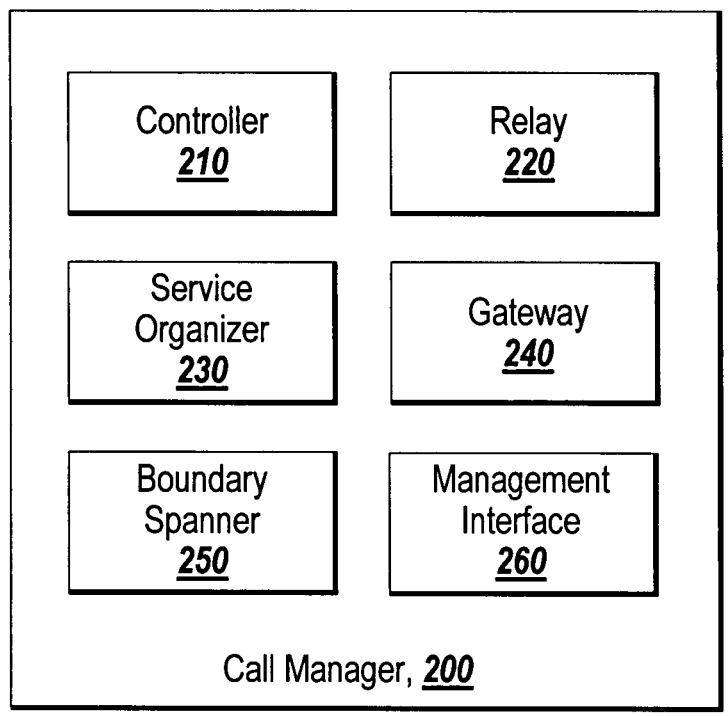
FIG. 2 depicts an exemplary call manager of the VoIP network of FIG. 1 in more detail.

FIG. 2 depicts the call managers 112, 142 and 144 in more detail. For clarity, unless otherwise stated, the call managers 112, 142 and 144 will hereinafter be commonly referred to as call manager 200. The call manager 200 includes a controller 210, a relay 220, a service organizer 230, a gateway 240, a boundary spanner 250 and a management environment 260. An example of the call manager 200 can be SESSION-SUITE™ from BlueNote Networks, Inc. of Tewksbury, Mass.

The controller 210 supplies fundamental session initiation protocol (SIP) capabilities including, but not limited to SIP Proxy, SIP Redirector, and SIP Registrar functions. The controller 210 can be RFC 3261 compliant and can provide a standards-based core signaling and control infrastructure. The controller 210 provides advanced admission control capabilities allowing VoIP calls to be rejected if insufficient resources are available to complete a call with acceptable quality and can integrate directly with enterprise information technology (IT) infrastructure such as RADIUS AAA servers and LDAP policy servers, thereby, allowing voice to be treated and managed in a manner similar to other IP applications.

The service organizer 230 can be used in conjunction with the controller 210 and provides traditional voice calling and point-to-point video features as a pure software solution. The service organizer 230 can deliver PBX calling functions along with value-added features such as voicemail, conference bridging, and Interactive Voice Response (IVR) and can work with a wide variety of standards-based softphones, SIP phones, and traditional analog telephones.

The gateway 240 bridges VoIP networks and traditional PSTN/PBX infrastructures, allowing VoIP users to place and receive calls with PBX users or users of the PSTN network. The gateway 240 works with standards-based third party analog and digital line adapters, and supports a variety of interfaces including, but not limited to TI CAS, ISDN PRI, and analog FXS/FXO.

The boundary spanner 250 enables flexible and integrated boundary solutions for NAT and firewall traversal. Modern enterprise networks are typically comprised of independent networks with unique address spaces. NAT devices are used to connect with external networks, while firewall technology is used to protect the local network from the outside world. The boundary spanner 250 can enable SIP-controlled communications flows through firewall and NAT boundaries. For example, the boundary spanner can traverse firewalls and NAT devices that separate a service provider from a service subscriber. The boundary spanner 250 can be used to extend corporate voice services to Internet-enabled mobile workers, or Internet-connected affiliates of an enterprise such as subsidiaries and suppliers. The boundary spanner 250 can provide connectivity and interoperability with external services, service providers and hosting facilities. The boundary spanner 250 can also provide additional naming and can identify features that allow enterprises to gain access to, use and manage external services.

The management environment 260 can be a Web-based application that manages the call manager 200 as well as services, resources, sessions, users and clients of the VoIP network 100. The management environment 260 can provide a common Web browser interface for managing all of the software components of the call manager, and offers integrated fault, configuration, performance and security management for all the call manager 200 functions. The management environment 260 can provide a user portal that allows subscribers of the services 230 to manage call handling and voicemail features through a secure Web browser. The management environment 260 can provide an XML/SOAP interface for integration with third-party or customer-developed management applications and networks.

The relay 220 provides voice and video traffic forwarding and switching under the control of the controller 210. The relay 220 can supply compression and transcoding and can support a variety of CODECs including, but not limited to G.711 variants, G.729 variants, and GSM for voice; and H.263 and H.264 for video. The relay 220 oversees voice and video quality, and enforces quality of service and traffic management policies.

The call manager 200 enables network testing to be built into the VoIP network 100 to determine the quality of the transmission network. To determine the quality of the transmission network the call manager may employ Bit Error Rate Testing (BERT) and IP loopbacks. The call manager 200 can use instrumented test streams to determine the quality of the transmission network.

The instrumented test streams can be a series of logical 1 and 0 values. The instrumented test streams can have any pattern of logical values and can be transmitted in packets by the call manager 200 such that blocks of logical values can be transmitted. The instrumented test streams can represent conditions that the VoIP network 100 can be exposed to in production. Alternatively, the instrumented test streams can be arbitrary or pseudorandom patterns that are meant to stress the VoIP network 100. The call manager 200 can be programmed with the test streams and can implement the test streams prior to the VoIP network is used in production. Alternatively, the call manager 200 can implement the tests streams when the VoIP is in production to ensure that the VoIP maintains a certain level of quality.

Figure 3:
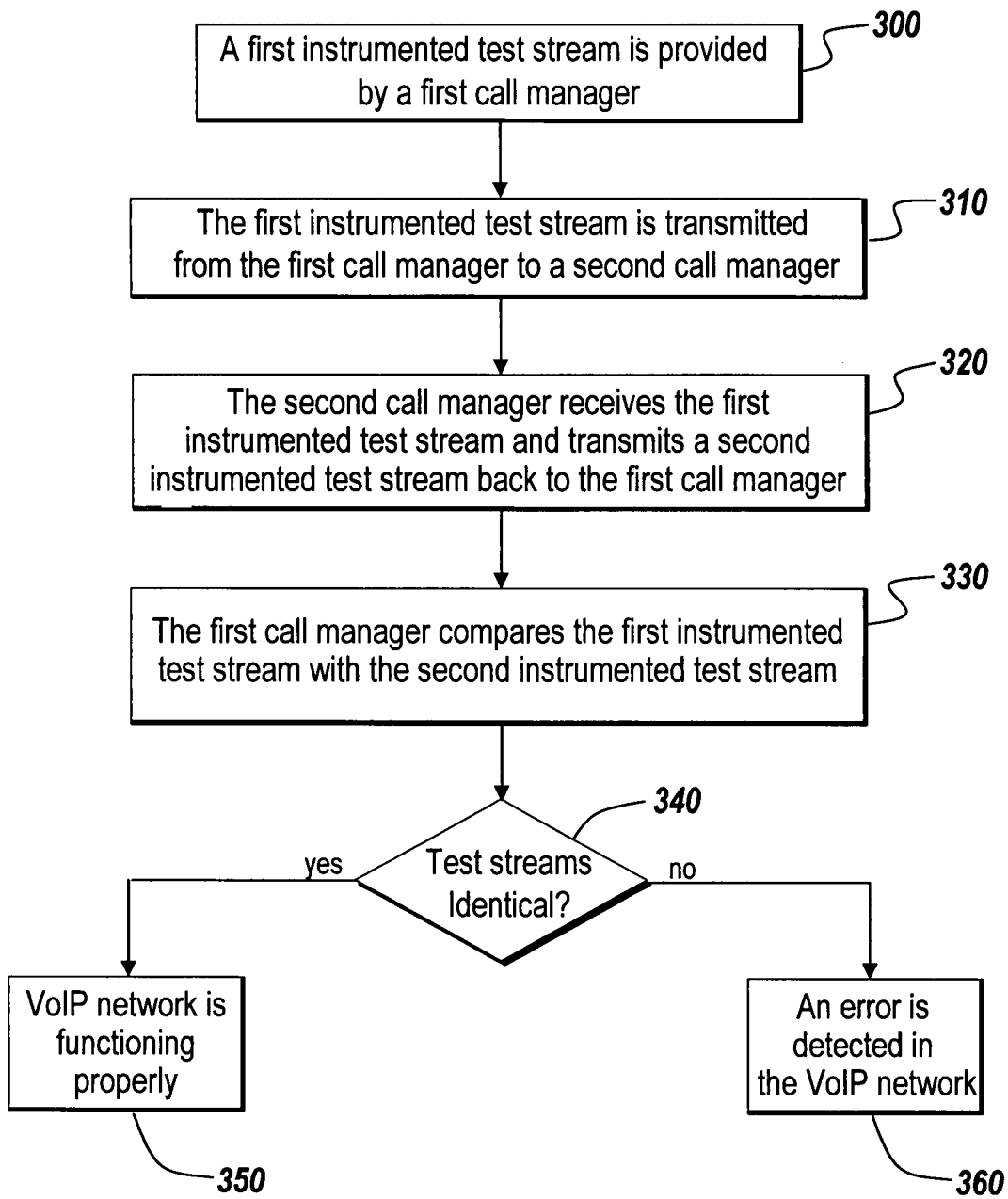
FIG. 3 is a flow diagram of the steps taken to test the VoIP network in accordance with the illustrative embodiment.

FIG. 3 is a flow diagram of the steps taken to test the VoIP network in accordance with the illustrative embodiment. A first instrumented test stream can be provided by the call manager 112 (step 300). The first instrumented test stream can be any pattern of bits such as, for example, an alternating pattern of 1's and 0's. The first instrumented test stream is transmitted to the call manager 142 from the call manager 112 (step 310). The instrumented test stream can be transmitted in packets to the call manager 142. The call manager 142 receives the first instrumented test stream and transmits a second instrumented test stream back to the call manager 112 (step 320). The second instrumented test stream is a retransmission of the instrumented test stream that the call manager 142 receives, and therefore should be identical to the first instrumented test stream. The call manager 112 compares the first instrumented test stream and the second instrumented test stream (step 330). If the first and second instrumented test streams are identical (step 340), the VoIP network 100 is functioning properly (step 350). If, however, the test streams are not identical (step 340), an error is detected and the VoIP network 100 may not be functioning properly (step 360). As a result of testing the VoIP network 100, diagnostic information about the VoIP network is determined, such as characteristics and test measurements of the VoIP network.

The first and second instrumented test streams may not be identical for many reasons. For example, there may be excessive jitter on the server 110. In this case, the call manager 112 may intend to transmit a particular pattern of bits, but due to jitter on the server 110, the instrumented test stream that is transmitted does not reflect the instrumented test stream that the call manager 112 intended to transmit. As a result, the call manager 142 never receives the intended instrumented test stream, and therefore, when the call manager 142 transmits the second instrumented test stream, the call manager 142 attempts to replicate the received instrumented test stream instead of the intended instrumented test stream. When the call manager 112 compares the second instrumented test stream to the intended instrumented test stream there is a mismatch. Likewise, the server 141 may have jitter such that the call manager 142 incorrectly receives or transmits the first instrumented test stream, and therefore causes a mismatch between the first and second instrumented test stream.

The VoIP network 100 may also suffer from packet loss, which can cause the first and second instrumented test streams to be mismatched. For example, the call manager 112 may transmit a first instrumented test stream that has a specified number of packets to the call manager 142. The call manager, however, may not receive or process all of the packets transmitted by the call manager 112. Alternatively, the call manager may receive all of the packets transmitted by the call manager 112, but when the call manager 142 retransmits the instrumented test stream, as the second instrumented test stream, to the call manager 112, the call manager 112 may not receive or process all of the packets.

The illustrative embodiment measures the packet loss, jitter and/or delay of the VoIP network 100 using the instrumented test streams. The VoIP network can also monitor the utilization and capacity of the VoIP network 100 to determine whether there is enough capacity to open a session. To monitor the utilization and capacity of the VoIP network 100, the call manager 200 can monitor a number of incoming and outgoing calls, and the protocol being used for the calls. The call manager 200 can also communicate with other call managers in the VoIP network to compare the utilization and capacity of the other call managers and the call manager 200. Based on these measurements and characteristics of the transmission network of the VoIP network, the call manager can select specific routes to use to process a session or can prevent a session from being opened.

Figure 4:
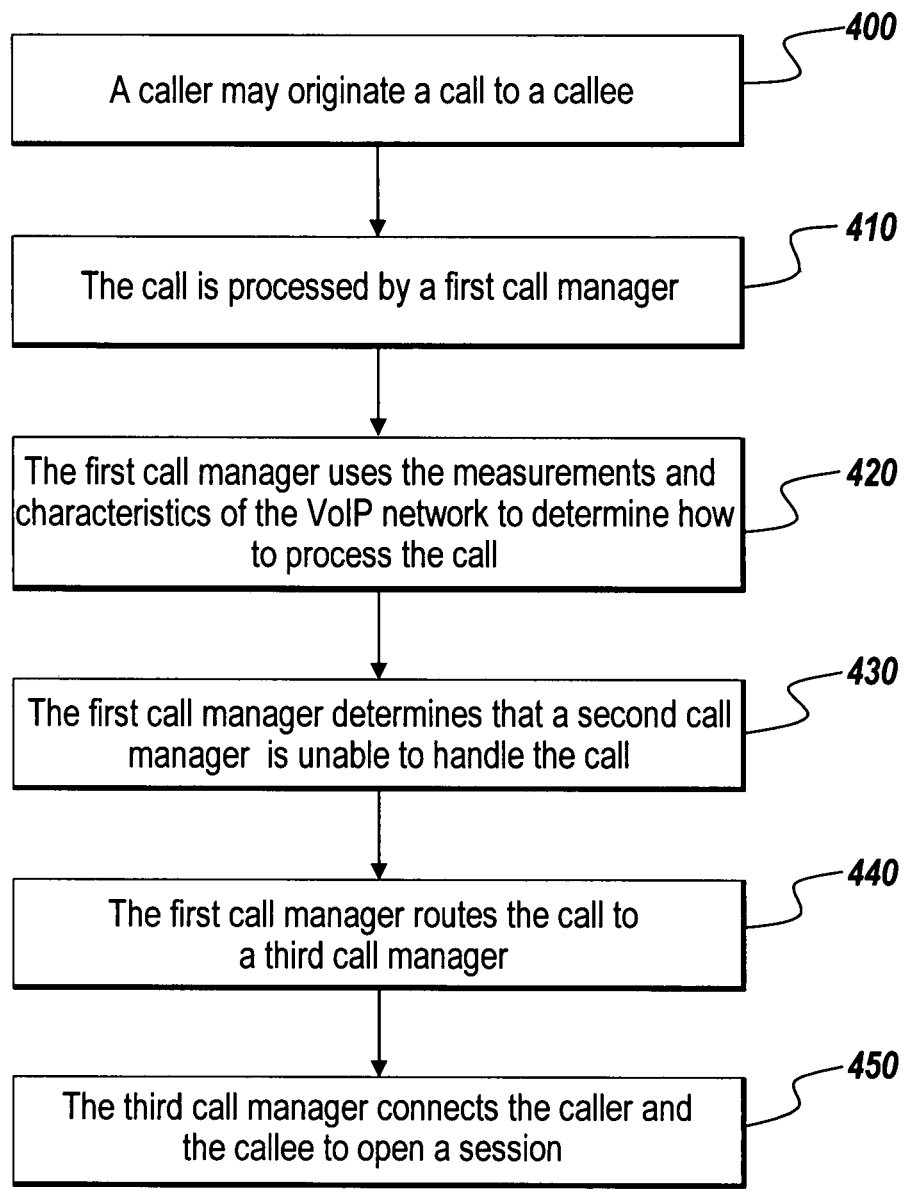
FIG. 4 is a flow diagram of the steps provided to determine how to process a call on a VoIP network in accordance with the illustrative embodiment.

FIG. 4 is a flow diagram of the steps performed by a call manager when determining how to process a call. A caller may originate a call to a callee (step 400). The call may be processed by a first call manager (step 410). The first call manager uses the measurements and characteristics of the VoIP network to determine how to process the call (step 420). The first call manager, for example, can determine that a second call manager is unable to handle the call (step 430). This determination can be based on, but not limited to the jitter, packet loss, delay, utilization and/or capacity of the transport network associated with the second call manager.

The first and/or second call managers periodically use instrumented tests streams to determine the quality of the call being processed by the second call manager. The first and/or second call manager can store information relating to the quality of the signals in the VoIP network. The first and/or second call managers can also monitor the utilization and capacity of the transport network associated with the first and/or second call managers. The first and/or second call managers can monitor the number of incoming and outgoing calls and can store information regarding the number of incoming and outgoing calls. The first and/or second call managers can also monitor the protocols being employed during the calls and can store information regarding the protocols being employed for each call.

After determining that the second call manager is unable to handle the call, the first call manager routes the call to a third call manager (step 440). The third call manager connects the caller and the callee to open a session (step 450). In the alternative the third call manager may represent an intermediate node in the VoIP network, such that the third call manager processes the call and determines where to route the call. For example, the third call manager may route the call to a fourth call manager, where the fourth call manager connects the caller and the callee to open a session.

Figure 5:
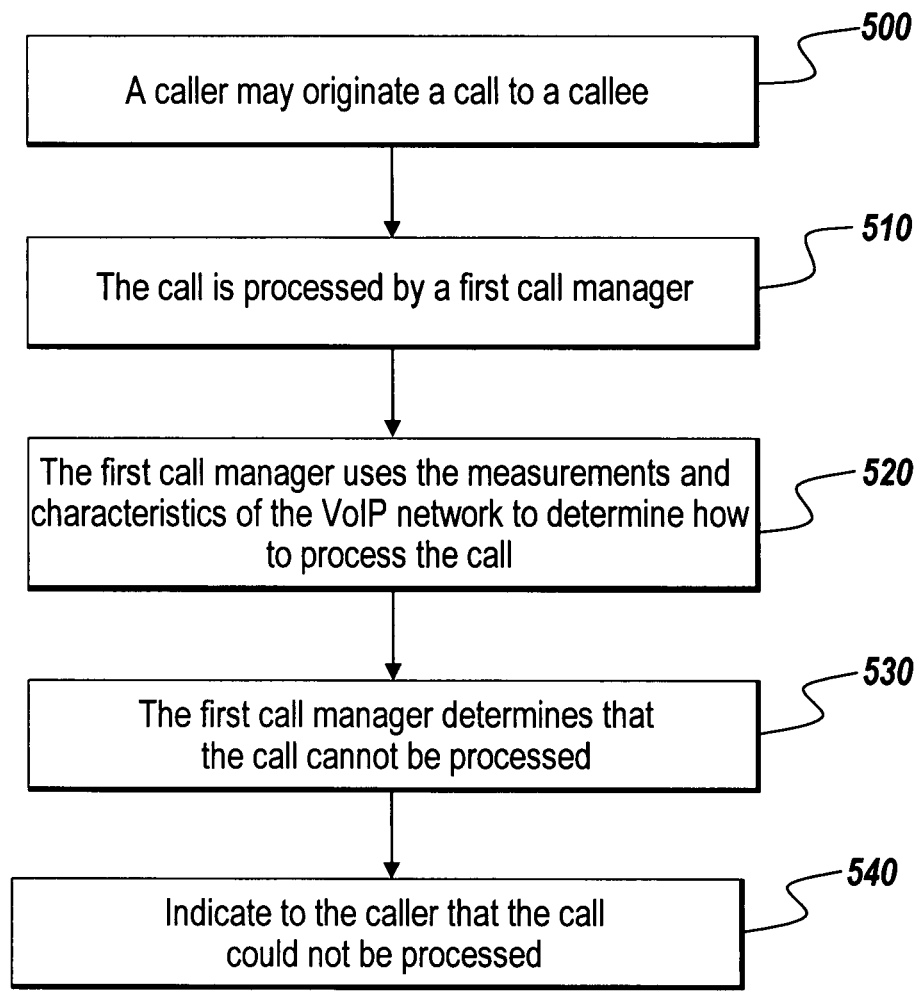
FIG. 5 is a flow diagram to illustrate the steps performed by the illustrative embodiment to prevent a call from being made.

FIG. 5 is a flow diagram of the steps performed to prevent a call from being made based on measurements and characteristics of the VoIP network. A caller may originate a call to a callee (step 500). The call may be processed by a first call manager (step 510). The first call manager uses the measurements and characteristics of the VoIP network to determine how to process the call (step 520). The first call manager, for example, can determine that the call can not be processed (step 530) based on, but not limited to the jitter, packet loss, delay, utilization and/or capacity associated with the VoIP network. After determining that the VoIP is unable to handle the call, the first call manager applies a signal to the caller to indicate that the call cannot be processed (step 540). The signal can be a periodic audible tone, such as a busy signal, or can be any other audible or visible indication to the user that the VoIP network cannot process the call.

Figure 6:
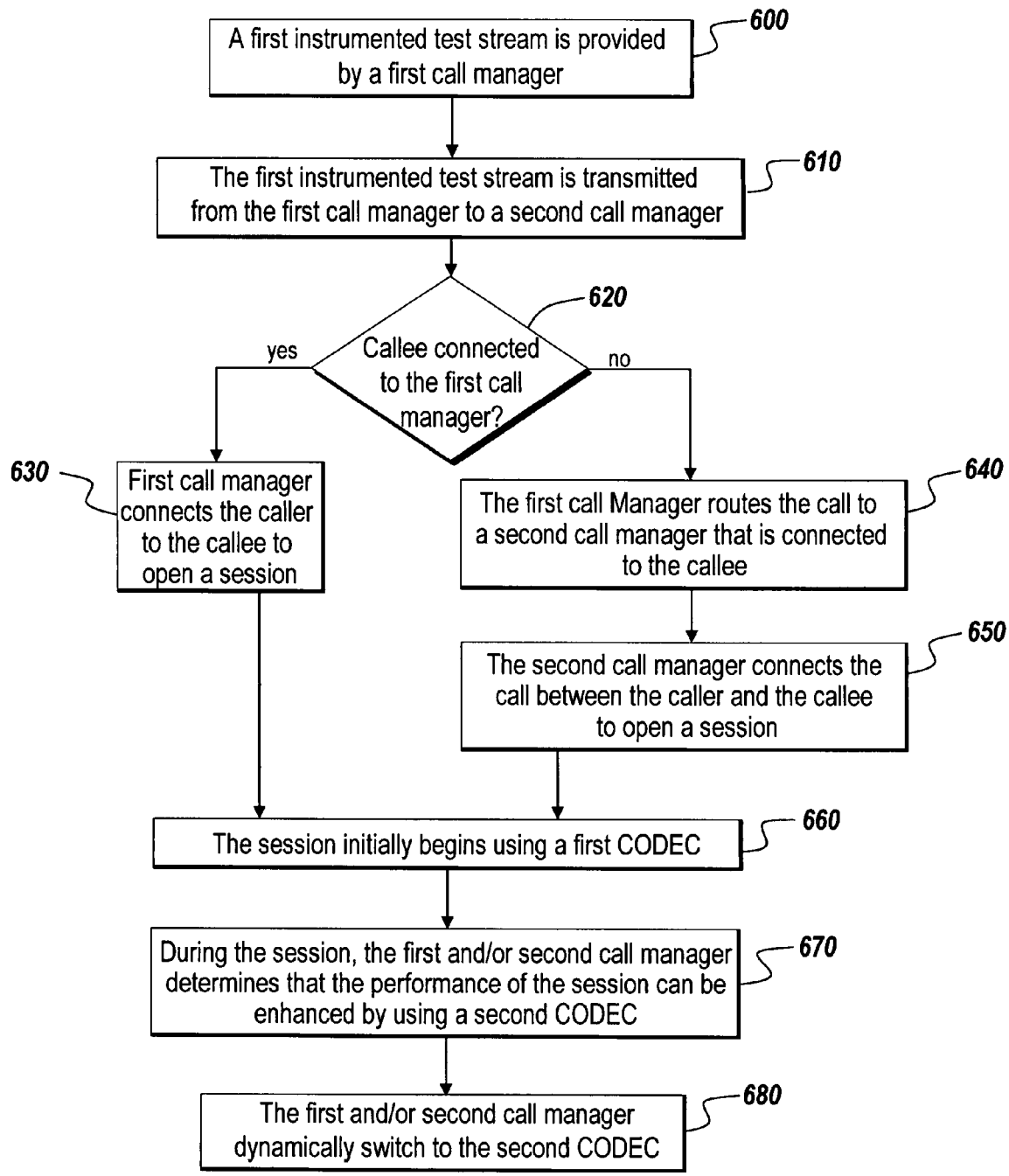
FIG. 6 is a flow diagram that illustrates the steps performed in the VoIP network to dynamically switch a CODEC.

The illustrative embodiment of the present invention enables the negotiation and dynamic switching of CODECs based on the characteristics of the transmission network to enhance the performance of a VoIP network for the user. FIG. 6 is a flow diagram that illustrates the steps performed in a VoIP network to dynamically switch a CODEC based on the characteristics of the transmission network. A caller can originate a call to a callee (step 600). A first call manager processes the call (step 610). If the callee is connected to the first call manager (step 620), the first call manager connects the caller to the callee to open a session (step 630). If, however, the callee is not connected to the first call manager (step 620), the first call manager routes the call to a second call manager that is connected to the callee (step 640). The second call manager connects the call between the caller and the callee to open a session (step 650). The session initially begins using a first CODEC (step 660). During the session, the first and/or second call manager can determine that the performance of the session can be enhanced by using a second CODEC for communication between the first and second call managers (step 670). Upon determining that the session can be enhanced, the first and/or second call manager can dynamically switch to the second CODEC (step 680). In this manner, the caller and the callee continue to communicate using the initially negotiated CODEC and the call managers communicate with the second CODEC. For example, the session may initially use the ITU (International Telecommunications Union) standard G.711 CODEC and the CODEC employed between the call managers may be dynamically switch to the ILBC (Internet Low Bit Rate CODEC) to improve the quality of the session.

Figure 7:
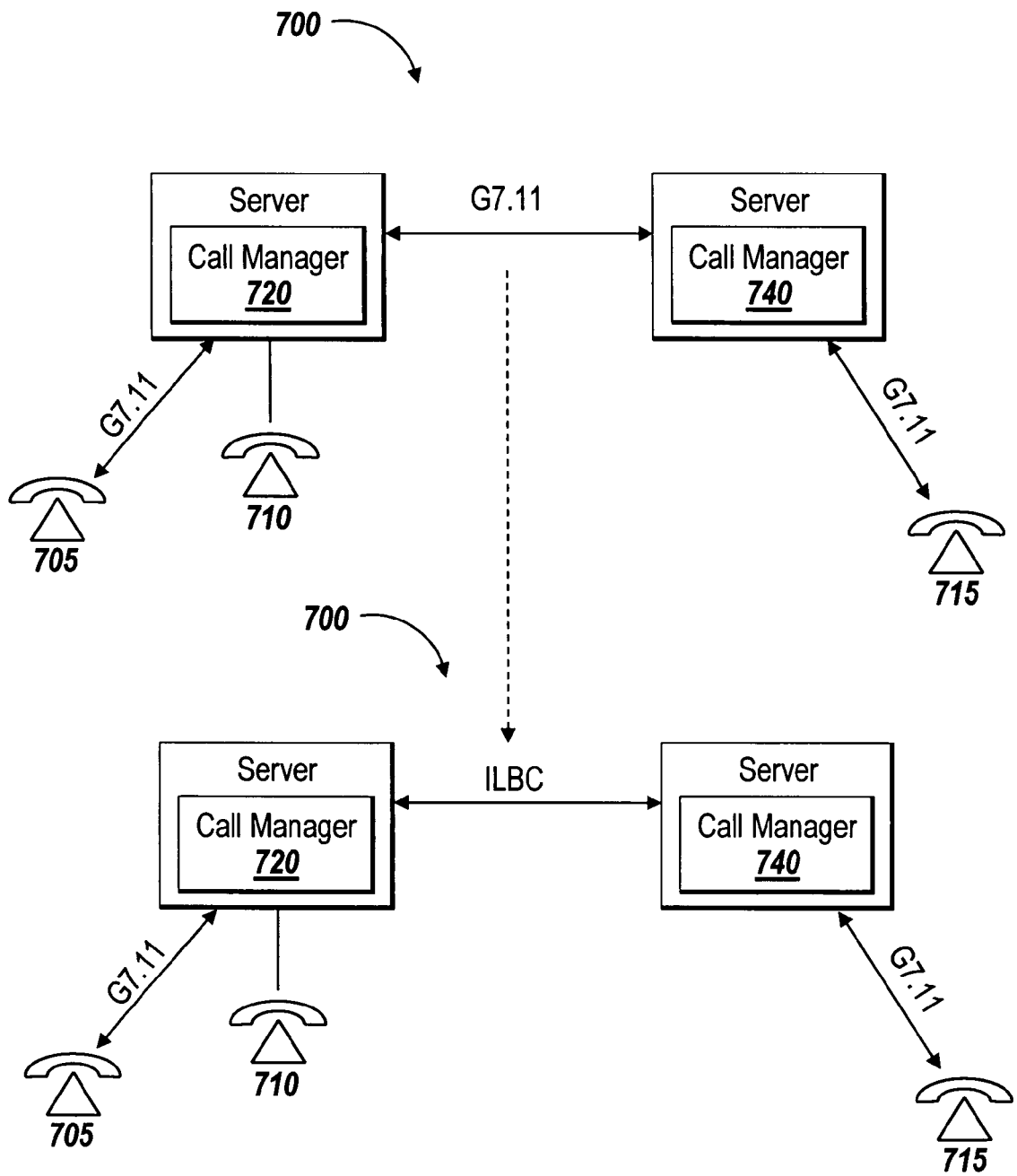
FIG. 7 graphically illustrate the negotiation and dynamic switching of CODECs in a VoIP network 700.

FIG. 7 graphically illustrate the dynamic switching of CODECs in a VoIP network 700. The VoIP network 700 includes call manager 720 and call manager 740. A communication device 705 and a communication device 710 are connected to the call manager 720 and a communication device 715 is connected to the call manager 740. A session can be established between the communication device 705 and the communication device 715 and an initial CODEC can be used. During the session, the initial CODEC that is used can be dynamically switched between the call managers 720 and 740 to another CODEC, while the communication devices 705 and 715 continue to use the initial CODEC.

While the above examples depict a session that includes two call managers, one skilled in the art will recognize that a session may be implemented across more then two call managers and that a CODEC may be dynamically switched between each call manager that is included in the session or that a CODEC may be dynamically switch between some of the call managers included in the session.

Certain embodiments of the present invention are described above. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method for testing a VoIP network wherein a call session between a caller and a callee is begun using a first CODEC, the method comprising the steps of:

generating a first instrumented test stream at a first call manager server at a first location;

transmitting the instrumented test stream from the first call manager server location to a second call manager server at a second location on the VoIP network without use of a dedicated test channel;

receiving the transmitted instrumented test stream at the second call manager server at the second location;

retransmitting from the second location the received instrumented test stream to the first location without use of a dedicated test channel; and determining diagnostic information about the VoIP network based on a comparison of the first instrumented test stream by the first call manager server with the retransmitted instrumented test stream including determining whether the retransmitted instrumented test stream is identical to the first instrumented test stream and routing a VOIP call based on the diagnostic information; and dynamically switching from the first CODEC to a second CODEC for communications between the first call manager server and the second call manager server while continuing communication with the caller and callee using the first CODEC, based upon the diagnostic information about the VOIP network in response to at least one of the first and second call manager servers determining that performance can be enhanced by switching to the second CODEC.

2. The method of claim 1, wherein the transmitting, retransmitting, and receiving are performed prior to the availability of the VoIP network for use and wherein the diagnostic information is used determine whether to reject allowing a VoIP call.

3. The method of claim 1, wherein the transmitting and receiving are performed after the availability of the VoIP network for use and wherein the instrumented test stream comprises logical values that represent conditions that the VOIP network is exposed to in use.

4. The method of claim 1 wherein the first instrumented test stream comprises a pseudo random pattern designed to stress the VOIP network.

5. The method of claim 1 further comprising the first call manager server monitoring protocols employed for call sessions, and storing information regarding the protocols employed for each call session.

6. The method of claim 1 further comprising the first call manager server communicating with other call manager servers in the VOIP network to compare capacity and utilization of the other call manager servers, and selecting routes to process a call based thereon.

7. The method of claim 1 further comprising the first call manager server periodically using instrumented test streams to determine quality of calls being processed by the second call manager server and wherein the first call manager also employs Bit Error Rate Testing and measures jitter to determine quality of the VOIP network.

8. The method of claim 1 further comprising the first call manager server routing the call to a third call manager server in response to determining that the second call manager server is unable to handle the call and the third call manager server determining where to route the call.

9. A computer-implemented method in a VoIP network, the method comprising the steps of:
   receiving a request to process a call from a caller;
   determining a characteristic of the VoIP network by transmitting an instrumented test stream from a first computer device on the VOIP network to a second computer device on the VOIP network without using a dedicated test channel, receiving the instrumented test stream and retransmitting the received instrumented test stream at the second computer device, and comparing the retransmitted test stream to the instrumented test stream at the first computer device to detect an error if the retransmitted test stream is not an identical match to the instrumented test stream and;
   selecting a specific route for processing the call based on the determined characteristics of the VoIP network; and
   processing the call using the selected specific route, wherein the call is begun between the caller and a callee using a first CODEC; and
   dynamically switching from the first CODEC to a second CODEC for communications between the first computer device and the second computer device while continuing communicating with the caller and the callee using the first CODEC based upon diagnostic information about the VOIP network in response to at least one of the first and second computer devices determining that performance can be enhanced by switching to the second CODEC.

10. The method of claim 9 wherein the instrumented test stream comprises a pseudo random pattern designed to stress the VOIP network.

11. The method of claim 9 further comprising the first computer device monitoring protocols employed for call sessions, and storing information regarding the protocols employed for each call session.

12. The method of claim 9 further comprising the first computer device communicating with other computer devices in the VOIP network to compare capacity and utilization of the other computer devices, and selecting routes to process a call based thereon.

13. The method of claim 9 further comprising the first computer device routing the call to a third computer device in response to determining that the second computer device is unable to handle the call and the third computer device determining where to route the call.

14. A system in a VoIP environment, the system comprising:
   a first computing device with an application loaded on the computing device for testing and monitoring characteristics of the VoIP network;
   wherein the application transmits, from the first computing device, a first instrumented test stream having a particular pattern of bits to a second computing device on the VOIP network without employing a dedicated test channel, the second computing device receives and retransmits the received first instrumented test stream to the first computing device, and the first computing device receives the retransmitted instrumented tested stream from the second computing device, the received retransmitted instrumented test stream being compared to the first instrumented test stream by the application on the first computing device to determine if the received retransmitted instrumented test stream is identical to the particular pattern of bits of the first instrumented test stream;
   initiating a call session between a caller and a callee using a first CODEC; and
   dynamically switching from the first CODEC to a second CODEC for communications between the first computing device and the second computing device while continuing communicating with the caller and the callee using the first CODEC based upon diagnostic information about the VOIP network in response to at least one of the first and second computing devices determining that performance can be enhanced by switching to the second CODEC.

15. The system of claim 14 further comprising the first computing devices monitoring protocols employed for call sessions, and storing information regarding the protocols employed for each call session.

16. The system of claim 14 further comprising the first computing device routing a call to a third computing device in response to determining that the second computing device is unable to handle the call, and the third computing device determining to route the call to a fourth computing device which opens a call session for the call.

* * * * *